United States Patent
Yule et al.

(10) Patent No.: US 8,559,555 B2
(45) Date of Patent: Oct. 15, 2013

(54) METHOD OF ACQUIRING A RECEIVED SPREAD SPECTRUM SIGNAL

(75) Inventors: Andrew T. Yule, East Grinstead (GB); Bryan D. Young, Haywards Heath (GB); Johan Peeters, Bierbeek (BE)

(73) Assignee: NXP B.V., Eindhoven (NL)

( * ) Notice: Subject to any disclaimer, the term of this patent is extended or adjusted under 35 U.S.C. 154(b) by 913 days.

(21) Appl. No.: 12/514,768

(22) PCT Filed: Nov. 13, 2007

(86) PCT No.: PCT/IB2007/054605
§ 371 (c)(1), (2), (4) Date: May 13, 2009

(87) PCT Pub. No.: WO2008/059441
PCT Pub. Date: May 22, 2008

(65) Prior Publication Data
US 2010/0054310 A1     Mar. 4, 2010

(30) Foreign Application Priority Data

Nov. 14, 2006 (EP) ..................... 06124056

(51) Int. Cl.
*H04L 27/00* (2006.01)
*H04B 1/707* (2011.01)

(52) U.S. Cl.
USPC .......................................... 375/316; 375/147

(58) Field of Classification Search
USPC .................. 375/130, 140, 147, 150, 316
See application file for complete search history.

(56) References Cited

U.S. PATENT DOCUMENTS

| | | | |
|---|---|---|---|
| 6,825,802 B2 * | 11/2004 | Warloe | 342/357.59 |
| 2003/0152021 A1 * | 8/2003 | Wang et al. | 370/208 |
| 2003/0161273 A1 * | 8/2003 | Sexton et al. | 370/252 |
| 2004/0239559 A1 * | 12/2004 | King et al. | 342/357.12 |
| 2006/0055594 A1 | 3/2006 | McConnell et al. | |
| 2007/0076783 A1 * | 4/2007 | Dishman et al. | 375/136 |

FOREIGN PATENT DOCUMENTS

| | | |
|---|---|---|
| EP | 1 122 554 A | 8/2001 |
| WO | 99/36795 A | 7/1999 |
| WO | 01/06669 A | 1/2001 |
| WO | 04001993 A | 12/2003 |
| WO | 2005/024453 A1 | 3/2005 |

* cited by examiner

*Primary Examiner* — Kevin M Burd

(57) ABSTRACT

A method of acquiring a received spread spectrum signal comprises receiving a spread spectrum signal, analyzing the received signal to detect interference within the received signal, and adapting the baseband processing of the received signal to reduce power consumption during periods of detected interference. This allows the GPS processing resources to be focussed on areas of signal where there is little or no interference, and this is possible without modification to the source of interference. The interference is detected from an analysis of the received signal, and in particular before the baseband digital signal processing.

17 Claims, 3 Drawing Sheets

METHOD OF ACQUIRING A RECEIVED SPREAD SPECTRUM SIGNAL

This invention relates to a method of acquiring a received spread spectrum signal, especially a GPS signal, together with a corresponding spread spectrum signal receiver.

It has been recognised that measures should be taken to enable a spread spectrum receiver to continue to receive even when there is a signal discontinuity. This may arise when the signal acquisition is inherently difficult because of low received signal strength, because of signal interference or because of multi-path distortion.

WO 2005/024453 discloses a method in which a replica signal is generated containing a pseudorandom noise code corresponding to that of the GPS signal which is intended to be acquired. This replica signal is modified to remove fragments corresponding to portions of the received signal which have not been received. The received signal and the modified replica signal are then coherently correlated.

This method of WO 2005/024453 enables the receiver to tolerate a fragmented received signal when there is poor signal reception as a result of the path between the transmitter and the receiver.

Signal interference is another cause of reduced signal quality. There is a drive to an increased level of integration of multiple communications systems within individual devices, and this can give rise to interference problems. For example GPS products are being developed for the PC market. These can take the form of external devices (external GPS dongles), but GPS systems will inevitably be integrated into personal computers (typically laptops).

Such integration increases the likelihood of interference from other transmission/reception systems within the host device, for example WiFi, Bluetooth or cellular telephony systems, due to the close proximity of their antennae and/or RF electronics.

This problem has also been recognised.

For example, WO 01/06669 discloses a GPS system in which the signal from a wireless cellular transmitter within the system is processed to derive a control signal for "desensitizing" the GPS receiver during times when the cellular transmitter is active. In particular, AGC (automatic gain control) setting is held constant while the transmitter is active.

U.S. Pat. No. 6,825,802 discloses a GPS system in which the correlation circuitry within the GPS receiver is controlled by "jammer response circuitry". This is a circuit, for example which forms part of a cellular transmitter, to indicate when transmission of a signal which could act as a jamming interference signal is taking place. The correlation circuitry is controlled to pause operation of accumulation circuitry within the correlators.

According to the invention, there is provided a method of acquiring a received spread spectrum signal within a communications device, comprising the steps of:

receiving a spread spectrum signal;

analysing the received signal to detect interference within the received signal from another wireless signal source of the communications device; and adapting the baseband processing of the received signal to reduce power consumption during periods of the detected interference.

The invention allows the GPS processing resources to be focussed on areas of signal where there is little or no interference, and this is possible without modification to the source of interference. The interference is detected from an analysis of the received signal, and in particular before the baseband digital signal processing.

Analysing the received signal may comprise analysing a signal within a front-end receiver. For example, the analysis may comprise monitoring a current drawn, monitoring an automatic gain control amplifier or monitoring an analogue to digital converter (for example monitoring the DC bias of the analogue to digital converter).

Alternatively, analysing the received signal may comprise monitoring the received signal after conversion to a digital baseband signal. In this case, the analysis may comprise monitoring a DC bias level of the signal, or monitoring a frequency spectrum (for example via an FFT) of the signal.

These alternatives provide simple ways to implement interference detection before the detailed signal processing.

Adapting the baseband processing can comprise discarding samples received during the detected interference, so that no further processing is carried out.

Alternatively, a predetermined correlation result can be assumed for the samples received during the detected interference. These approaches enable correlation results to be obtained but without processing data that has been destroyed.

The invention also provides a computer program for implementing the method of the invention.

The invention also provides a spread spectrum signal receiver, comprising:

an antenna for receiving a spread spectrum signal;

means for analysing the received signal to detect interference within the received signal from another wireless signal source of the communications device; and means for adapting the baseband processing of the received signal to reduce power consumption during periods of detected interference.

The present invention will now be described, by way of example only, with reference to the accompanying schematic drawings in which.

This invention relates to a method of acquiring a received spread spectrum signal within a communications device, for example a GPS signal, and concerns communications devices which have another wireless signal source. This second wireless signal source can be a short range communications link, such as Bluetooth or a long range communications link, for example for a cellular telephony network.

Figure 1:
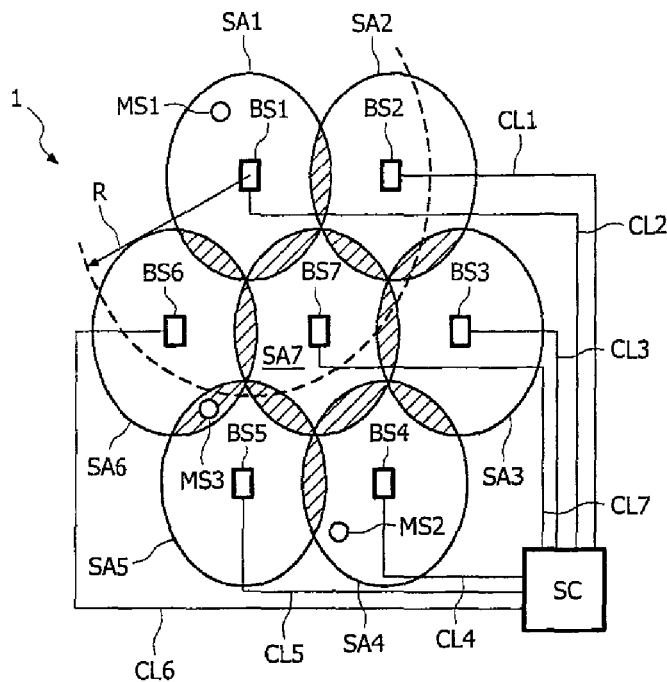
FIG. 1 shows the geographic layout of a cellular telephone network in which the cellular telephones have a GPS receiver, as one example of GPS receiver with other RF circuitry.

By way of example, the geographical layout of a conventional cellular telephone network 1 is shown schematically in FIG. 1, to illustrate one example of a communications device which combines GPS communication with another wireless communications protocol.

The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line.

The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
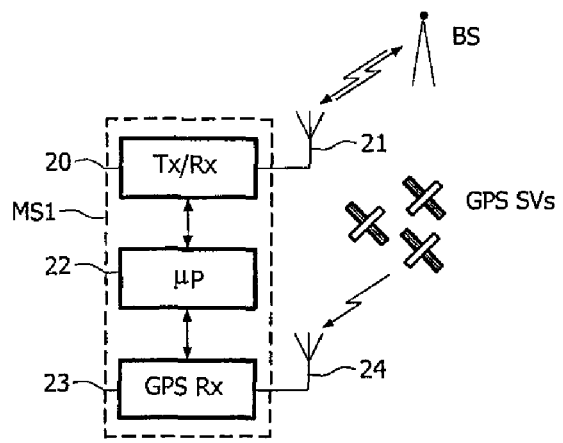
FIG. 2 shows a mobile cellular telephone MS1 of FIG. 1 in greater detail.

Referring to FIG. 2, telephone MS1 is shown in greater detail comprising a communications transmitter (Tx) and receiver (Rx) 20 connected to a communications antenna 21 and controlled by a communications microprocessor (μp) 22 for communication with the base station BS with which it is registered.

In addition to the conventional components of a mobile telephone, telephone MS1 further comprises a GPS receiver (GPS Rx) 23 connected to a GPS antenna 24. When operative, the GPS receiver receives NAVSTAR SPS GPS signals and pre-processes them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory (not shown) of the communications microprocessor (μp) 22. The communications microprocessor is configured to acquire and track GPS signals for the purpose of deriving pseudorange information from which the location of the mobile telephone can be determined using conventional navigation algorithms.

This example shows that a single device may have multiple transmitters and receivers. The same can apply to communication devices which are not linked to a main cellular telephone network, for example laptop computers which can connect at hotspots using WiFi or using Bluetooth.

The methods for GPS signal acquisition, tracking and position determination are well known, for example, GPS Principles and Applications (Editor, Kaplan) ISBN 0-89006-793-7 Artech House. Also, the design and manufacture of telephones such as telephone MS1 are well known and those parts which do not directly relate to the present invention will not be elaborated upon here further.

The invention is of particular interest for so-called "software GPS", namely a GPS system in which all the data processing is implemented in software, with the received data stored in a memory buffer. This enables the real time link of the receiver to be broken, and reduces the amount of dedicated hardware required (such as correlators).

Figure 3:
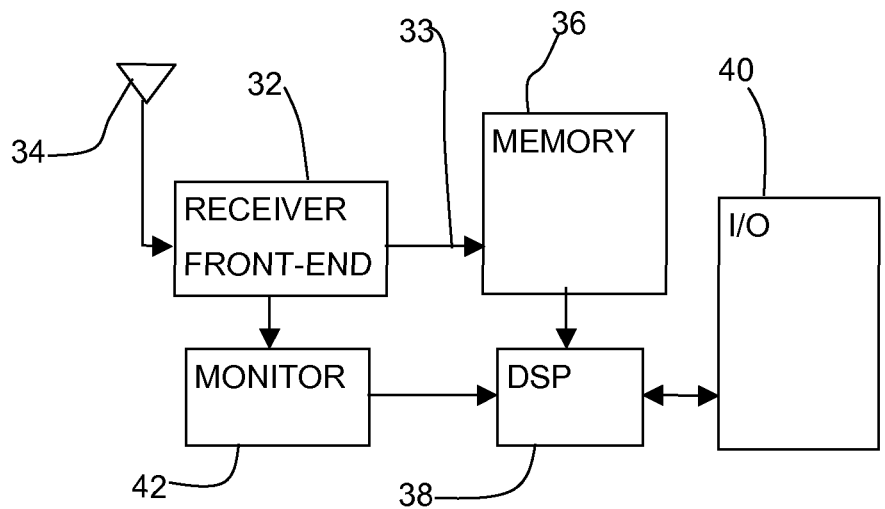
FIG. 3 shows a conventional GPS receiver architecture in schematic form.

The basic architecture of a software GPS receiver 30 is represented in FIG. 3.

The receiver comprises a receiver front-end 32, which receives the wireless signals using an antenna 34. The receiver front-end 32 receives modulated RF signals from one or more satellites.

The received signal is amplified, filtered, down-converted, and digitized by the receiver front-end 12 to produce a baseband signal 33 derived from the received signal, an in the form of digitised samples.

The digitised samples are provided to a memory buffer 36, and the data stored in the memory 36 is processed by a general purpose CPU i.e. a digital signal processor (DSP) 38. A user interface is provided by input/output system 40. The digitised samples are processed to extract the information and data from the satellite signals. The data samples are typically in the form of one or two bit data, and at a much higher analogue to digital sampling rate than the data rate of the signals received from the satellites.

The DSP 38 implements the functions of more conventional dedicated hardware systems, of correlation, multiplexing and Fourier transformations, in known manner.

Figure 4:
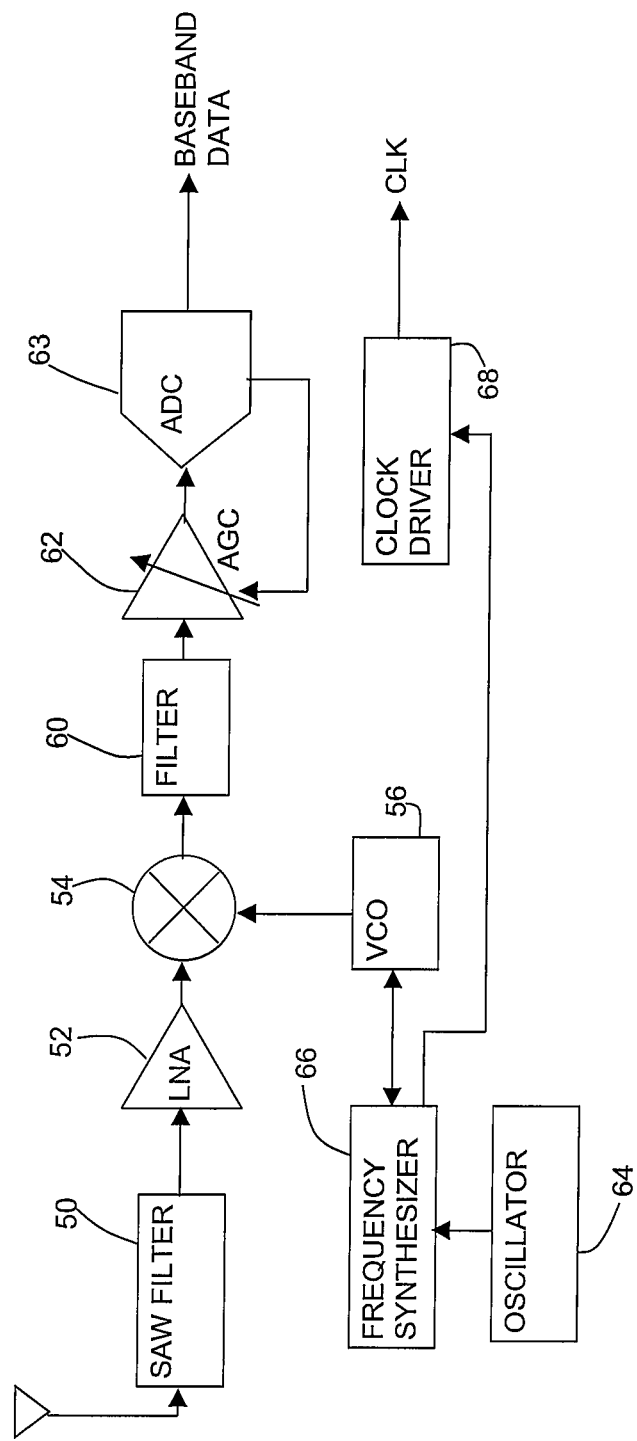
FIG. 4 shows the front-end receiver in greater detail.

FIG. 4 shows the front-end receiver 32 in greater detail.

The signals received from the antenna are filtered by a surface acoustic wave (SAW) filter 50 before amplification by a low noise amplifier (LNA) 52. The signals are mixed at mixer 54 with the output of a voltage controlled oscillator (VCO) 56. This downconverts the signals to baseband, where they are subjected to further filtering by filter 60 and amplification with automatic gain control (AGC) in the amplifier 62. Analogue to digital conversion takes place in converter 63, which also provides a feedback control for the AGC setting. The front-end receiver also includes an oscillator 64 and frequency synthesizer 66 as shown, with the frequency synthesiser controlling a clock driver 68 to generate a clock signal CLK.

Interference between different communications systems, as discussed above, impacts on the ability to receive the GPS signal in the analogue domain, whereas after the A/D conversion, the signals become (effectively) immune to interference/jamming (and other "analogue" effects).

When the GPS receiver is built into another device (such as a PC) in close proximity to a radio which transmits in unpredictable "bursts", such as a WiFi transceiver, then during the "bursts" the samples generated by the GPS A/D converter are likely to contain no useful GPS signal information as interference will dominate.

The invention provides analysis of the received signal to detect interference within the received signal. The baseband processing of the received signal is then altered to reduce power consumption during periods of detected interference. In this way, the GPS receiver can itself detect when this interference is taking place, so that it can save processing effort (and thus battery/CPU power) by discarding or ignoring the affected samples.

There are two main ways in which the detection of interference can be implemented.

In a first embodiment, the front-end circuitry (of FIG. 4) is designed in such a way so as to detect the interference and flag this to the controller 40 using an alert signal (for example a separate output pin, driven high when interference is detected).

There are a number of mechanisms for detecting interference within the front-end receiver 32. A first detection mechanism can be implemented by monitoring of the current drawn by the front-end receiver. This current will rise in the presence of substantial interference. To implement this monitoring, an amplifier can be used which exhibits a variation of current drawn with signal amplitude, such as a Class B amplifier.

A second detection mechanism can involve a monitoring mechanism associated with the AGC amplifier 62, as the interference will cause the ADC feedback signal and the AGC gain setting to vary abruptly.

A third detection mechanism within the front-end receiver 32 can involve a monitoring mechanism associated with the analogue to digital converter, for example based on detected changes in the DC bias, owing to overloading/compression occurring in the receiver chain.

The implementation of the required monitoring circuitry will be routine to those skilled in the art, and is represented schematically as unit 42 in FIG. 3.

In a second embodiment, the digital processing implemented by the DSP 38 can be used to detect the interference. In its simplest form, this can be implemented by monitoring the DC bias level, and spotting a mismatch in the ratio of 1's and 0's in the sign bit. This is indicative of a signal which is not a pure GPS signal, as this would on average have a balanced occurrence of positive and negative data values.

In this case, the monitoring arrangement forms part of the DSP 38.

The analysis in the digital processor can instead be based on an FFT or other frequency spectrum analysis of the signal, to search for significant spikes in the spectrum.

Each of these measures can be implemented before any correlation calculations by the DSP 38, and therefore positions calculations, are carried out. These measures thus operate either in the analogue domain within the receiver front-end, or based on the raw baseband digitized data.

Having detected interference, the baseband processing can then take advantage of the detected interference indication using a number of possible techniques.

A first approach is to discard the affected samples, thus saving memory. This avoids any digital signal processing of the samples and saves processing power as well as memory usage.

However, a correlation result for the affected samples may nevertheless be required. In this case, a second approach is for a correlation result to be assumed rather than calculated, thus again saving processing power. The assumed correlation results could be "zero" or an extrapolated value from correlations done on adjacent unaffected samples.

A third approach is to choose not to process the affected samples, but to do the processing on earlier and/or later unaffected samples (again saving processing cost).

Figure 5:
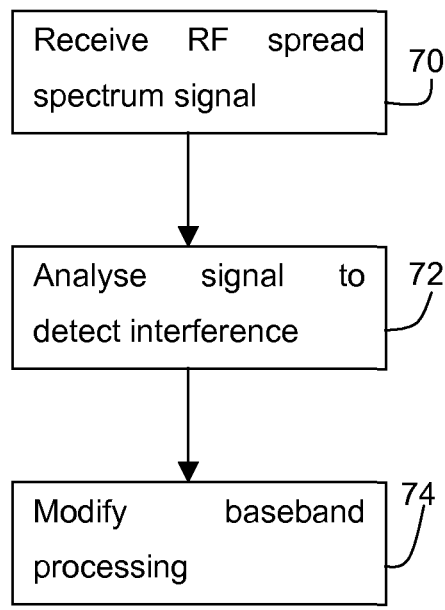
FIG. 5 is a flow chart to show the method of the invention.

The method of the invention is shown generally in FIG. 5.

Step 70 is the step of receiving a spread spectrum signal, step 72 is the analysis of the received signal to detect interference, in one or more of the different ways outlined above. Step 74 is the adaptation of the baseband processing of the received signal to reduce power consumption during periods of detected interference.

This invention is particularly applicable to Software GPS, however it could also be applicable to "conventional" hardware GPS techniques. The invention can be used for all GPS systems. Furthermore, the invention can be applied to other spread spectrum communications systems, as these all require significant signal processing to implement the multiple correlation calculations.

The invention is of particular interest for portable battery operated devices, where savings in processing power are particularly important.

From a reading of the present disclosure, other modifications will be apparent to the skilled person and may involve other features which are already known in the design, manufacture and use of GPS receivers and component parts thereof and which may be used instead of or in addition to features already described herein.

The invention claimed is:

1. A method of acquiring a received spread spectrum GPS signal within a GPS receiver device, comprising the steps of:
receiving a spread spectrum GPS signal;
digitizing samples from the received spread spectrum GPS signal;
analysing the received GPS signal to detect interference within the received GPS signal from another wireless signal source of the communications device, wherein analysing the received GPS signal comprises spotting a mismatch in a ratio of 1's and 0's in a sign bit of the digitized samples before correlation calculations and position calculations are carried out using the digitized samples; and
adapting the baseband processing of the received GPS signal to reduce power consumption by discarding or ignoring the samples during periods of the detected interference.

2. A method as claimed in claim 1, wherein analysing the received GPS signal comprises analysing a signal within a front-end receiver.

3. A method as claimed in claim 2, wherein analysing the received GPS signal comprises monitoring a current drawn by an amplifier of the front-end receiver.

4. A method as claimed in claim 2, wherein analysing the received GPS signal comprises monitoring the analogue to digital converter.

5. A method as claimed in claim 4, wherein analysing the received GPS signal comprises monitoring the DC bias of the analogue to digital converter.

6. A method as claimed in claim 1, wherein analysing the received GPS signal comprises monitoring the received GPS signal after conversion to a digital baseband signal.

7. A method as claimed in claim 6, wherein analysing the received GPS signal comprises monitoring a DC bias level.

8. A method as claimed in claim 6, wherein analysing the received GPS signal comprises monitoring a frequency spectrum of the GPS signal.

9. A method as claimed in claim 1, wherein adapting the baseband processing comprises assuming a predetermined correlation result for the samples received during the detected interference.

10. A spread spectrum signal GPS receiver, comprising:
an antenna for receiving a spread spectrum GPS signal;
means for digitizing samples from the received spread spectrum GPS signal;
means for analysing the received GPS signal to detect interference within the received GPS signal by spotting a mismatch in a ratio of 1's and 0's in a sign bit of the digitized samples before correlation calculations and position calculations are carried out using the digitized samples; and;
means for adapting the baseband processing of the received GPS signal to reduce power consumption by discarding or ignoring the samples during periods of detected interference.

11. A receiver as claimed in claim 10, comprising a front-end receiver and a baseband digital processor, wherein the means for analysing the received GPS signal is for analysing a signal within the front-end receiver.

12. A receiver as claimed in claim 11, wherein the means for analysing the received GPS signal comprises a monitor of drawn current.

13. A receiver as claimed in claim 10, wherein the means for analysing the received GPS signal comprises a circuit for monitoring the DC bias of the analogue to digital converter.

14. A receiver as claimed in claim 12, comprising a front-end receiver and a baseband digital processor, wherein the means for analysing the received GPS signal is for analysing a signal after conversion to a digital baseband signal.

15. A receiver as claimed in claim 14, wherein the means for analysing the received GPS signal comprises means for monitoring a DC bias level.

16. A receiver as claimed in claim 15, wherein the means for analysing the received GPS signal comprises means for monitoring an FFT of the GPS signal.

17. A receiver as claimed in claim 11, wherein the means for adapting the baseband processing comprises software adapted to assume a predetermined correlation result for the samples received during the detected interference.

* * * * *